United States Patent [19]

Kita et al.

[11] B 3,999,165
[45] Dec. 21, 1976

[54] INTERRUPT INFORMATION INTERFACE SYSTEM

[75] Inventors: Yuzo Kita; Kazuo Watanabe, both of Kokubunji, Japan

[73] Assignee: Hitachi, Ltd., Japan

[22] Filed: Aug. 27, 1973

[21] Appl. No.: 391,844

[44] Published under the second Trial Voluntary Protest Program on March 16, 1976 as document No. B 391,844.

[52] U.S. Cl. ............................................. 340/172.5
[51] Int. Cl.² ........................................... G06F 3/00
[58] Field of Search ................ 340/172.5; 445/1

[56] References Cited

UNITED STATES PATENTS

| | | | |
|---|---|---|---|
| 3,380,042 | 4/1968 | Townsend et al. | 340/172.5 |
| 3,395,394 | 7/1968 | Cottrell, Jr. | 340/172.5 |
| 3,599,162 | 4/1971 | Byrns et al. | 340/172.5 |
| 3,629,852 | 12/1971 | Thexton | 340/172.5 |
| 3,665,405 | 5/1972 | Sanders | 340/172.5 |
| 3,755,787 | 8/1973 | Heneger | 340/172.5 |
| 3,794,970 | 2/1974 | Pearson et al. | 340/172.5 |

*Primary Examiner*—Harvey E. Springborn
*Attorney, Agent, or Firm*—Craig & Antonelli

[57] ABSTRACT

Interrupt signals are set into interrupt level memory registers each of which is provided for each interrupt level, and an interrupt receiving register having a number of bits equal to the number of interrupt level memory registers is disposed within an LSI computer. Transmission of interrupt information from the interrupt level memory registers to the receiving register is effected through a single interface line in synchronism with clock pulses.

8 Claims, 5 Drawing Figures

INTERRUPT INFORMATION INTERFACE SYSTEM

BACKGROUND OF THE INVENTION

1. Field of the Invention

The present invention relates to generally an interrupt information interface system and, more particularly, to an interface system in which a single interface information line is used between the external sources of interrupt or interrupt condition memories and a computer proper.

2. Description of the Prior Art

Referring to FIG. 1, a typical interrupt information interface system for use with a computer will be described. Reference numeral 4 designates a computer proper, and portion 1 corresponds to interrupt level memory registers positioned outside the computer. For each of n interrupt levels, one register is provided, and each level consists of m interrupts each of which corresponds to each bit of each register. Thus, $n \times m$ interrupt information lines are provided for setting interrupt information. When an interrupt condition occurs, the corresponding bit of the interrupt level memory register 1 is set to a logical "1". The logic sum of all of the interrupts in each of the registers is derived through an OR gate 3.

The outputs of the OR gates 3 are transmitted through interface lines 12 to an interrupt receiving register 5 in the computer proper 4. Each bit of the register 5 corresponds to each of the interrupt levels, respectively. When an interrupt is set to any bit of any interrupt level memory register 1, the corresponding bit of the interrupt receiving register 5 is set to a logical 1 through the OR gates 2 and the interface lines 12. An interrupt mask register 6 masks the reception of any desired interrupt level, and has a number of bits equal to the number of the interrupt levels, each bit corresponding to each bit of the register 5. The bits of the interrupt mask register 6 are set through set bus lines 10 in a hardware or software manner.

An AND gate 7 is provided to obtain the logic product of the corresponding bits of the registers 5 and 6. When an interrupt signal is set into the interrupt receiving register 5 and the corresponding bit of the interrupt mask register 6 is 1, that is, when the interrupt level is not masked, the output of the AND gate 7 is applied to a control gate 13 through an OR gate 8. Reference numeral 9 denotes an output line of an interrupt mask flip-flop (not shown) for masking temporarily all of the interrupts. That is, if the signal on the output line 9 is "0", no interrupt is permitted.

When the signal on the output line 9 is 1, the interrupt pulse is transmitted to and sets a receiving flip-flop 14 through the control gate 13 so that the signal is transmitted through an output line $14_0$ for the processing of interrupt.

In the conventional interface system of the type described hereinbefore, interrupt signal lines 12 equal in number to the number $n$ of interrupt levels are required. The number of interrupt levels varies dependent upon the use and type of an electronic computer, and is generally 8 – 32 and more than 128 when a computer is used for process control.

When the number of interrupt information lines is increased, wiring becomes very complex and expensive, but these problems are not so serious in case of the conventional computers.

LSI techniques have been recently so progressed that one computer is provided on only one chip. The above problems are very serious in case of the LSI computers. That is, the interface between the computer and peripheral equipment is restricted because of the limited number of terminals on the LSI chip so that it becomes extremely difficult to use the conventional interface system in the highly integrated LSI computers. Especially, in the case of a computer formed in one LSI chip to be referred to as a "one-chip computer" in this specification, the number of pins on a chip is limited, so that it is impossible to apply the conventional interface system. When the number of pins is increased, the yield is reduced, the reliability is adversely affected, and the cost becomes very expensive.

SUMMARY OF THE INVENTION

In view of the above, the primary object of the present invention is to provide an interrupt interface system which may be satisfactorily applied to an LSI one-chip computer.

Briefly stated, registers into which interrupt information is set and an LSI one-chip computer are interconnected by a single interface line so that the set interrupt information may be transferred in serial in synchronism with clock pulses.

The above and other objects, features and advantages of the present invention will become more apparent from the following description of one preferred embodiment thereof taken in conjunction with the accompanying drawing.

BRIEF DESCRIPTION OF THE DRAWING

The same reference numerals are used to designate similar parts throughout the figures.

DESCRIPTION OF THE PREFERRED EMBODIMENT

Figure 1:
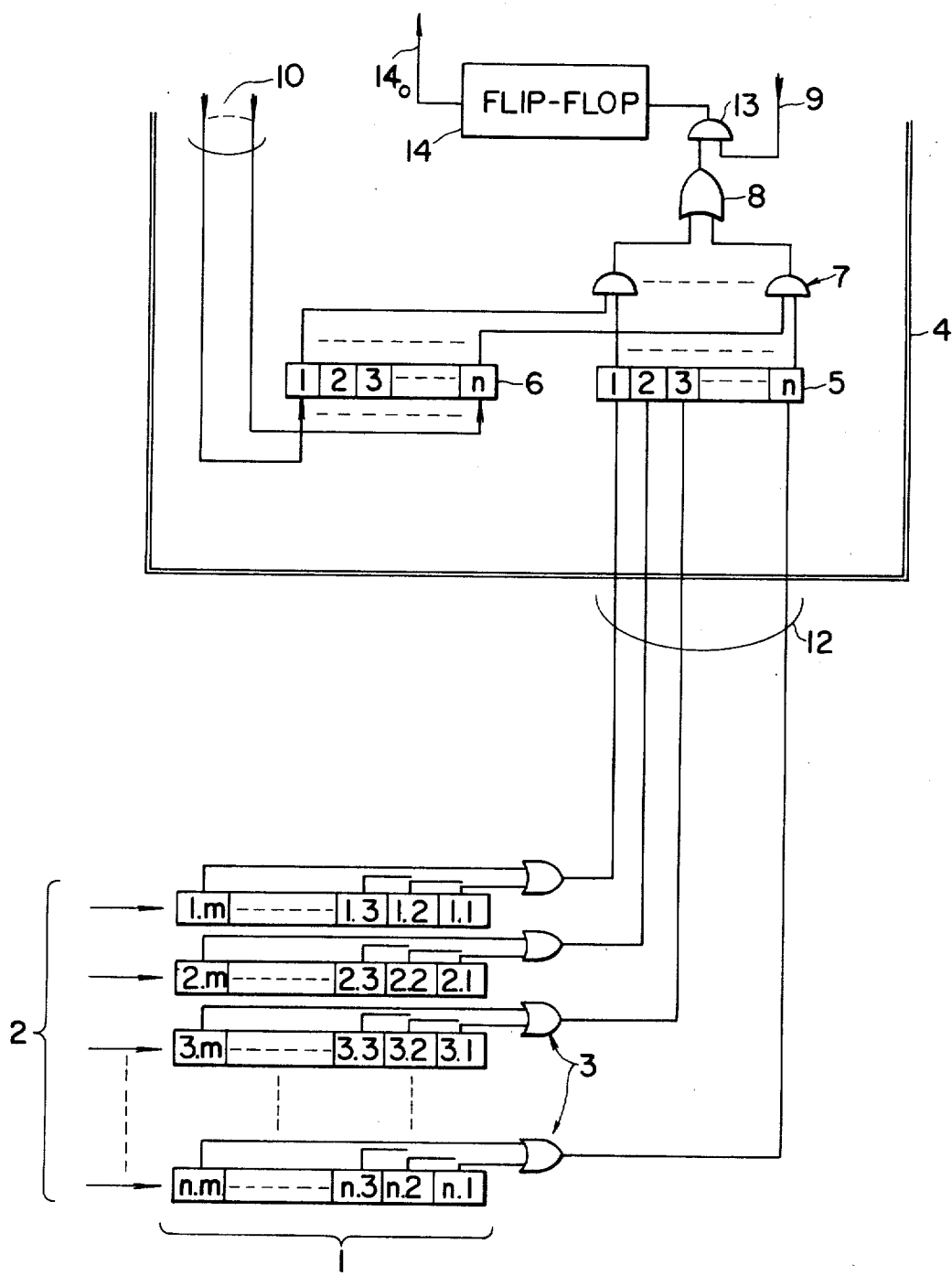
FIG. 1 is a block diagram of a conventional interrupt information interface system.
Figure 2:
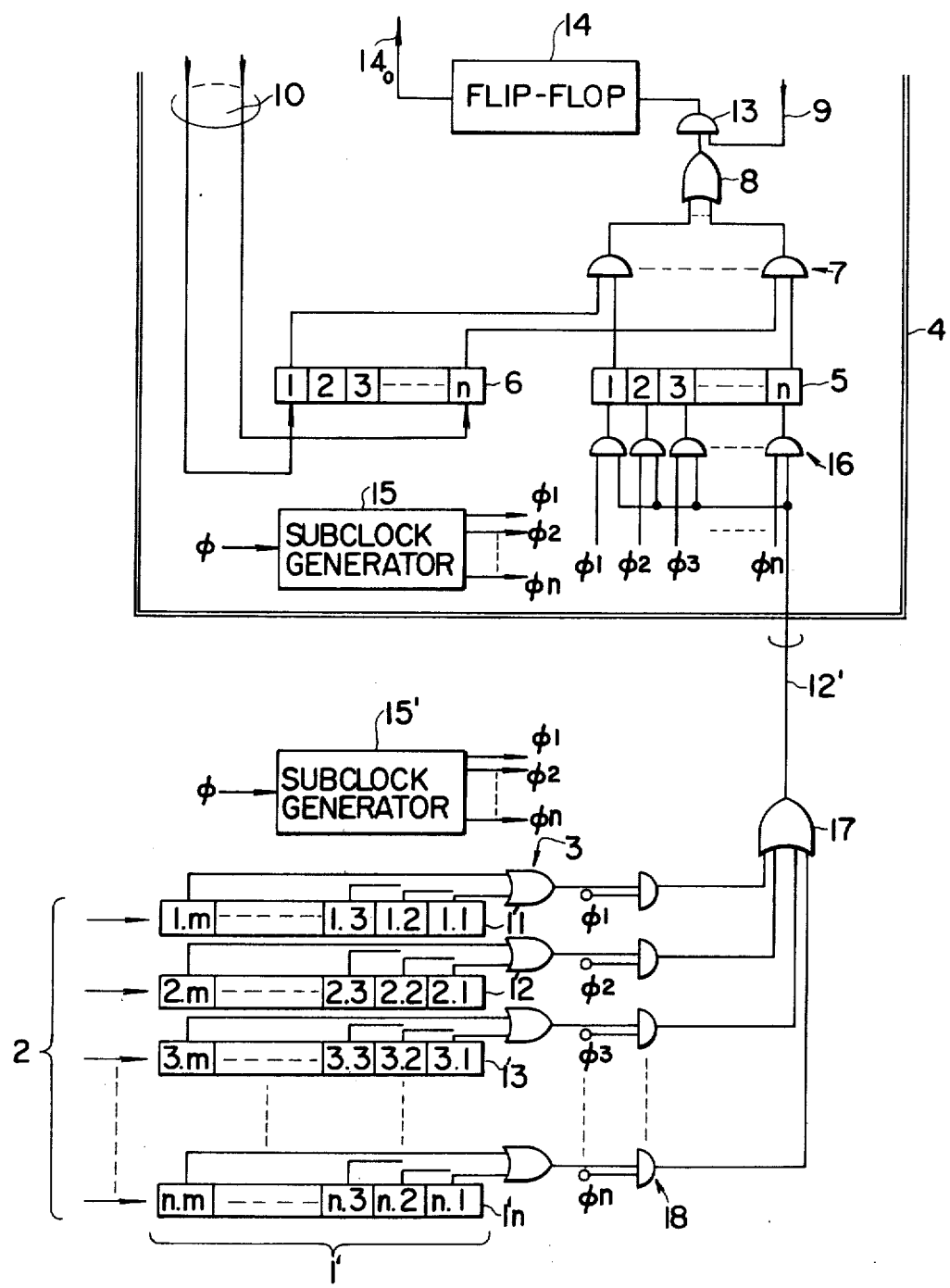
FIG. 2 is a block diagram of an interrupt information interface system in accordance with the present invention.

Referring to FIG. 2, illustrating, in block diagram form, an interrupt information interface system in accordance with the present invention, subclock generators 15 and 15' are provided within and external to the computer 4 proper, and are adapted to generate interrupt subclocks $\phi_1-\phi_n$ from the machine clock or a clock $\phi$ having a frequency equal to $1/n$ of the frequency of the machine clock. The clock pulses generated by the subclock generator 15 are applied to AND gates 16, whereas the clock pulses from the generator 15' are applied to AND gates 18. The subclock generators 15 and 15' are synchronized through a clock line (not shown).

The interrupt signals which are the output signals of the OR gate 3 are converted into serial information by the AND gates 18 and transmitted through the OR gate 16 and a single interface line 12' to the computer 4 proper, that is, to the AND gates 16. The AND gates 16 are controlled in response to the clock pulses $\phi_1-\phi_n$, so that the serial information may be converted again into parallel information to be transferred into the interrupt receiving register 5.

Figure 3:
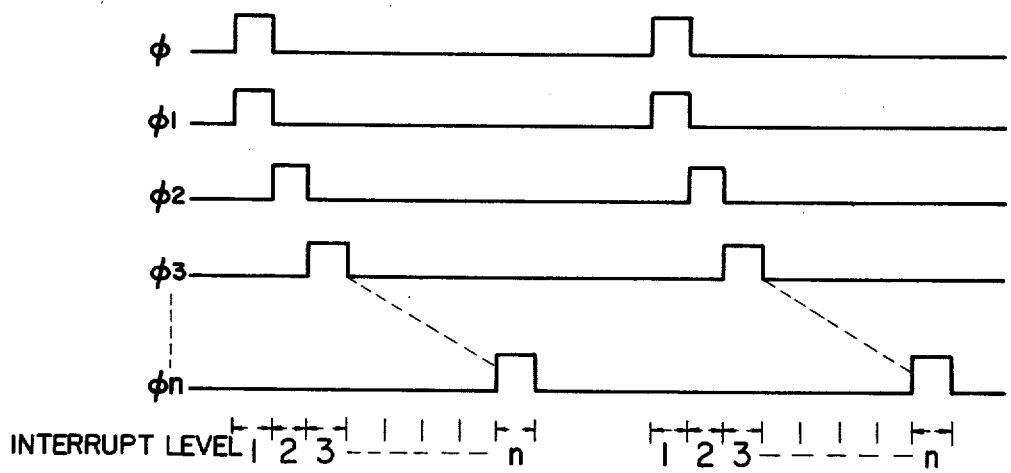
FIGS. 3, 4 and 5 are time charts used for the explanation of the mode of operation thereof.
Figure 4:
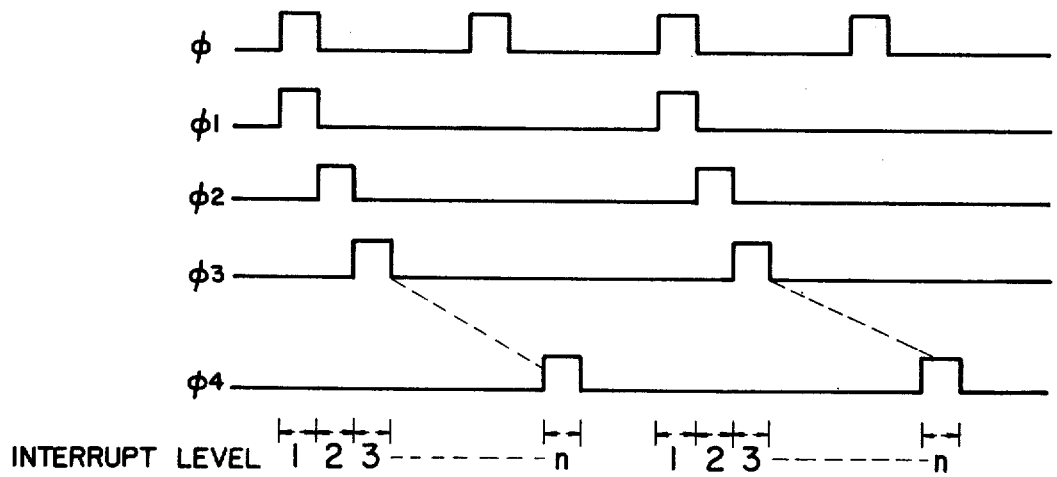

FIGS. 3 and 4 illustrate the relation between the subclock pulses and the interrupt levels set. In response to a timing pulse, $\phi_1$, the logic sum of the bits of the interrupt memory register 1' is set into the first bit of the interrupt receiving register 5 in the computer 4 proper through the interface line 12'. In like manner, in response to the timing pulses $\phi_2$, $\phi_3$, ....., and $\phi_n$ the interrupt information of the interrupt levels from 2 to $n$ are sequentially set into the second, third, ..... and $n$-th bits of the interrupt receiving register 5. When the number of interrupt levels n is small, all of interrupt levels are set into the interrupt receiving register 5 in one machine clock $\phi$ period as shown in FIG. 3, but when the number of interrupt levels is increased, more than two machine cycles are required to set all of interrupt information into the interrupt receiving register 5, as shown in FIG. 4. In this case, it is simple to design the subclock generator 15 on such a way that the machine clock $\phi$ produced when the interrupt information is being set may be disregarded.

The fundamental techniques for converting parallel information into serial information in the manner described above are well known in the field of communications and other fields. The techniques of converting parallel information into serial information have not been used in the interface system of conventional computers, since serial time-division transmission generally has a low transmission efficiency as compared with parallel transmission. However, high-speed processing of interrupt is not required in the computer, unlike data transmission, so that the efficiency of the processing of interrupt and other data is not adversely affected by the decrease in the efficiency of serial data transmission. According to the present invention, only one interface line is used, so that the interface system of the present invention may be advantageously used with an LSI one-chip computer in which the number of pins is limited.

According to the present invention a priority interrupt interface system for LSI one-chip computers may be realized when the interrupt subclock pulses are modulated in the manner to be described hereinafter.

Figure 5:
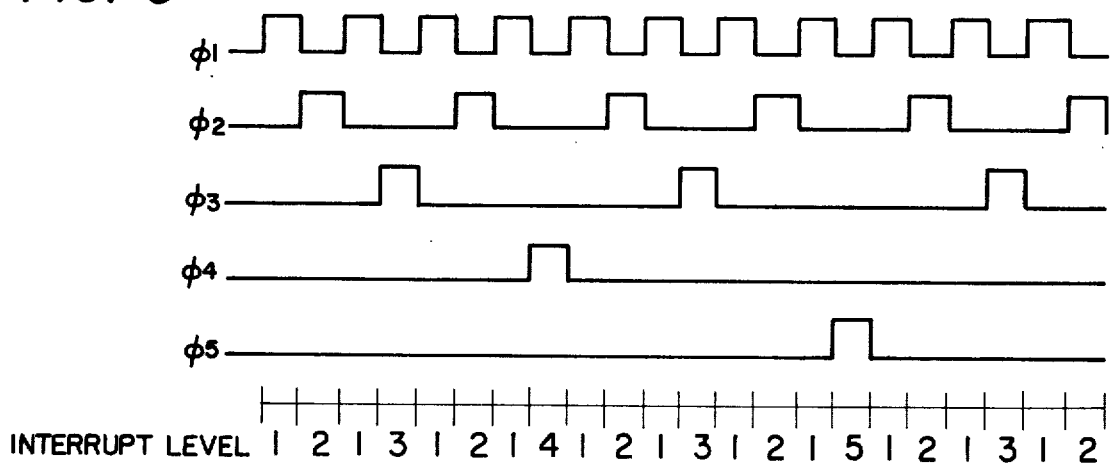

When the interrupt subclock pulses $\phi_1$–$\phi_n$ are produced repetitively, the reception of the interrupt of each level is effected with the same duty $1/n$ regardless of the interrupt level. As is clear from an interrupt level with priority, there is an interrupt with a high priority and an interrupt with a low priority. Therefore, the subclocks $\phi_1$-$\phi_n$ are so generated that the duty of the timing for receiving the interrupt levels may be modulated according to the priority. Then there may be provided an interrupt interface system for LSI one-chip computers utilizing the priority interrupt feature. FIG. 5 shows an example of the modulation in which the interrupt level 1 has the highest priority whereas the interrupt level $n$ has the lowest priority, so that the duty of the timing pulses $\phi_i$ may be in proportion to $1/2i$.

The timing pulse generator adapted to generate the timing pulses modulated in the manner described above may be arranged with a flip-flop and a few gate circuits. FIG. 5 shows the example in which the probability of receiving the interrupt level $i$ is proportional to $1/2i$, but various modulation systems may be employed as the need arises. For example, the interrupt level receiving timing pulses may be modulated in proportion to the probability of occurrance of interrupts. Also, the timing pulses may be so modulated that both the probability of occurrance of interrupts and the priority level of the interrupts may be taken into consideration.

As described hereinbefore, in the interrupt interface system for LSI one-chip computers in accordance with the present invention, the interface may be effected in synchronism with the subtiming pulses $\phi_1$–$\phi_n$ generated both within and without the computer proper and the interrupt information set into the external interrupt level memory registers is transmitted through a single interface line to the interrupt receiving register within the computer. In the interface system, the decrease in efficiency in parallel transmission will not substantially adversely affect the efficiency of the system. Thus, the present invention provides a very effective interrupt interface system. Furthermore, the interrupt receiving timing pulses $\phi_1$–$\phi_n$ are modulated depending upon the priority of the interrupt level, so as to vary the duty of the timing pulses whereby a very effective interrupt interface may be provided.

When the interface system of the present invention is applied to LSI one-chip computers, only one terminal of an LSI chip is required for attaining the interrupt processing function corresponding to that of a medium-sized computer.

What we claim is:

1. In an interrupt information interface system for delivering interrupt signals to a computer, said computer including an interrupt receiving register having a prescribed bit storage capacity for receiving respective interrupt signals from a plurality of interrupt level memory registers, the number of which interrupt level memory registers is equal to the number of interrupt levels of said interrupt signals and corresponds to said prescribed bit storage capacity of said interrupt receiving register, the improvement comprising:

clock generator means for generating a series of clock pulses;

first gate means, coupled to said plurality of interrupt level memory registers and said clock generator means, for gating the contents of said interrupt level memory registers therefrom in accordance with said series of clock pulses over a single interface line to said computer; and second gate means, coupled to said single interface line and said clock pulse generator means, for gating interrupt level signals, representative of the contents of said plurality of interrupt level memory registers, transmitted over said signal interface line, to the respective bit storage positions of said interrupt receiving register.

2. The improvement according to claim 1, wherein said first gate means comprises a plurality of AND gates each respective one of which is coupled to receive the contents of a respective interrupt level memory register and one of the clock pulses of said series of clock pulses, and an OR gate having a plurality of inputs connected to the outputs of said AND gates and having a single output connected to said interface line.

3. The improvement according to claim 1, wherein said second gate means comprises a plurality of AND gates, the outputs of which are respectively connected to the bit storage positions of said interrupt receiving register, and each of which AND gates is connected in common to said single interface line and respectively to receive one of the clock pulses of said series of clock pulses.

4. The improvement according to claim 2, wherein said second gate means comprises a plurality of AND gates, the outputs of which are respectively connected to the bit storage positions of said interrupt receiving register, and each of which AND gates is connected in common to said single interface line and respectively to receive one of the clock pulses of said series of clock pulses.

5. The improvement according to claim 1, wherein said clock pulse generator means has a plurality of output lines, corresponding to said plurality of interrupt level memory registers, for supplying to said first and second gate means respective trains of pulses of the same frequency but delayed with respect to one another, so as to sequentially gate the contents of said interrupt level memory registers to said single interface line.

6. The improvement according to claim 1, wherein said clock pulse generator means has a plurality of output lines, corresponding to said plurality of interrupt level memory registers, for supplying to said first and second gate means respective trains of pulses of differing frequency and delayed with respect to one another, in accordance with the priority of the respective interrupt levels.

7. The improvement according to claim 4, wherein said clock pulse generator means has a plurality of output lines, corresponding to said plurality of interrupt level memory registers, for supplying to said first and second gate means respective trains of pulses of the same frequency but delayed with respect to one another, so as to sequentially gate the contents of said interrupt level memory registers to said single interface line.

8. The improvement according to claim 4, wherein said clock pulse generator means has a plurality of output lines, corresponding to said plurality of interrupt level memory registers, for supplying to said first and second gate means respective trains of pulses of differing frequency and delayed with respect to one another, in accordance with the priority of the respective interrupt levels.

* * * * *